US 6,732,122 B2

(12) United States Patent
Zoltan

(10) Patent No.: US 6,732,122 B2
(45) Date of Patent: *May 4, 2004

(54) SYSTEM AND METHOD OF SYNCHRONIZING REPLICATED DATA

(76) Inventor: William Zoltan, 222 W. Las Colinas Blvd., Suite 450, Irving, TX (US) 75039

( * ) Notice: Subject to any disclaimer, the term of this patent is extended or adjusted under 35 U.S.C. 154(b) by 0 days.

This patent is subject to a terminal disclaimer.

(21) Appl. No.: 10/336,076

(22) Filed: Jan. 3, 2003

(65) Prior Publication Data

US 2003/0158852 A1 Aug. 21, 2003

Related U.S. Application Data

(63) Continuation of application No. 09/638,324, filed on Aug. 14, 2000, now Pat. No. 6,529,917.

(51) Int. Cl.⁷ .............................................. G06F 12/00
(52) U.S. Cl. .................... 707/201; 707/200; 714/775; 370/324
(58) Field of Search .................... 707/1–9, 10, 100, 707/101, 102–104.1, 200–202; 714/1, 6, 52, 775, 819; 712/28, 300; 370/310, 324; 715/531

(56) References Cited

U.S. PATENT DOCUMENTS

| | | | | |
|---|---|---|---|---|
| 4,631,673 A | | 12/1986 | Haas et al. ................ 707/100 |
| 4,641,274 A | | 2/1987 | Swank ...................... 715/531 |
| 5,129,082 A | | 7/1992 | Tirfing et al. ................ 707/3 |
| 5,479,654 A | | 12/1995 | Squibb ...................... 707/201 |
| 5,649,089 A | | 7/1997 | Kilner ........................ 714/6 |
| 5,737,601 A | * | 4/1998 | Jain et al. .................. 707/201 |
| 5,765,172 A | * | 6/1998 | Fox .......................... 707/204 |
| 5,802,528 A | * | 9/1998 | Oki et al. ................... 707/201 |
| 5,832,235 A | | 11/1998 | Wilkes ....................... 709/247 |
| 5,842,216 A | | 11/1998 | Anderson et al. ............ 707/203 |
| 5,870,759 A | * | 2/1999 | Bauer et al. ................ 707/201 |
| 5,870,765 A | * | 2/1999 | Bauer et al. ................ 707/203 |
| 5,884,325 A | * | 3/1999 | Bauer et al. ................ 707/201 |
| 5,926,816 A | * | 7/1999 | Bauer et al. .................. 707/8 |
| 5,946,689 A | * | 8/1999 | Yanaka et al. ................ 707/10 |
| 5,970,502 A | * | 10/1999 | Salkewicz et al. .......... 707/201 |
| 5,974,574 A | * | 10/1999 | Lennie et al. ................ 714/52 |
| 6,044,381 A | * | 3/2000 | Boothby et al. ............ 707/201 |
| 6,058,401 A | | 5/2000 | Stamos et al. .............. 707/201 |
| 6,438,562 B1 | * | 8/2002 | Gupta et al. ................ 707/201 |
| 6,532,479 B2 | * | 3/2003 | Souder et al. .............. 707/201 |

\* cited by examiner

*Primary Examiner*—Greta Robinson
*Assistant Examiner*—Linh Black
(74) *Attorney, Agent, or Firm*—Bell, Boyd & Lloyd LLC

(57) ABSTRACT

A replication method is provided for synchronizing master and satellite data tables, including several acts. An identifier column is generated for each table of a tree of master tables. The tree of master tables is copied to a tree of satellite tables, so that the tree of satellite tables is a replica of the tree of master tables. An insert trigger is associated with each of the master tables. Inserts are allowed to be made to at least one of the master tables, and synchronizing the tree of satellite tables to the tree of master tables. Key and checksum columns of each of the master tables are compared with key and checksum columns of each of the satellite tables. Row sets of rows are produced, wherein each row set includes those rows present in the master table but not in the satellite table. The rows that are present in the satellite tables but not in the corresponding master tables are determined by comparing the key and checksum columns of the master tables to those of the satellite tables, and, are deleted. The row sets of rows are then inserted into the satellite tables.

3 Claims, 7 Drawing Sheets

SYSTEM AND METHOD OF SYNCHRONIZING REPLICATED DATA

RELATED APPLICATION DATA

The present invention is a continuation of U.S. Pat. application Ser. No. 09/638,324 now U.S. Pat. No. 6,529,917 filed on Aug. 14, 2000.

FIELD

The present invention has emerged from the field of synchronizing databases.

BACKGROUND

The present invention relates generally to computing systems in which there are kept a number of replicated databases, and in particular to a method for comparing the databases quickly and efficiently.

In a clustered computing environment, as well as other environments, it is required to provide each node with information concerning the cluster (e.g., the location of processor units, peripheral units, etc.), its use, its users, and the like. Often kept in a database of one sort or another, the amount of this information can be quite large. This leads to problems when the databases of each node need to be checked, such as when a periodic check needs to be made to ensure the integrity of the database and the information it contains, or to ensure that changes to the database were made correctly. Such checks, however, can be very time consuming, and tend to impose a significant burden on system resources, particularly if such checks are frequently required. If the checks require communication between two nodes across a communication path, the amount of communication can be significant and create a bottleneck.

Under certain conditions, it is desirable to store copies of a particular body of data, such as a relational database table, at multiple sites in a distributed compute network. If users are allowed to update the body of data at one site, the updates must be propagated to the copies at the other sites in order for the copies to remain consistent. The process of propagating the changes is generally referred to as replication. Various mechanisms have been developed for performing replication.

The table at which a change is initially made to a set of replicated data is referred to herein as the master table. A table to which the change must be propagated is referred to herein as a satellite table. Replication does not require an entire transaction executed at a master table to be re-executed at each of the satellite tables. Only the net changes made by the transaction need to be propagated. Other types of operations, such as read and sort operations, that may have been executed in the original transaction do not have to be re-executed at the satellite tables.

There are two basic approaches to replication: synchronous replication and asynchronous replication. In synchronous replication, each update or modification of a body of data is immediately replicated to all other replicas or copies of the body of data within the distributed network, typically by techniques such as a two-phase commit. The transaction that modifies the body of data is not allowed to complete until all other replicas have been similarly updated. Although synchronous replication provides a straightforward methodology for maintaining data consistency in a network this method is susceptible to network latencies and intermittent network failures. Furthermore, synchronous replication cannot prioritize updates; accordingly, low priority updates can unnecessarily produce significant system delays.

On the other hand, in asynchronous replication, local replicas of a particular data structure are allowed to be slightly different for a time until an asynchronous update is performed. During asynchronous replication, a master table can be modified without forcing a network access as in synchronous replication methodology. At some later point time in time, the modification is propagated to the satellite tables. Various techniques for asynchronous propagation have been developed for example, remote procedure calls (RPCs) and deferred transaction queues.

In asynchronous replication, conflicts in updating a body of data might occur if two sites concurrently modify the same data item before the data modification can be propagated to other sites. If update conflicts are not first detected and then handled in some convergent manner, the data integrity of the replicated copies will begin to diverge.

Database systems often locally replicate remote tables that are frequently queried by local users. By having local copies of heavily accessed data on several nodes, the database does not need to send information across the network every time a transaction on any of the several nodes requires access to the data. Thus, the use of local copies of data improves the performance of the requesting node and reduces the amount of inter-node traffic.

The copies of data stored at replicated sites may diverge from the data at the original or "base" site for any number of reasons. For example, software problems or conflict resolution issues may cause a database to replicate data incorrectly. To determine whether discrepancies exist between different copies of the same data, it would be beneficial to have a mechanism for comparing the replicated data to the corresponding data in the base site. Once the discrepancies are identified, they can be rectified.

The prior art have solved many of the problems apparent from the above discussion. However, still present has been the problem that replication of database information is performance intensive and time consuming, absorbing computing and communication resources from other computing and networking tasks.

In view of the foregoing, it would be highly desirable to make available a method of replicating data that is both quick and relatively undemanding of computing, and especially networking, resources.

SUMMARY

Disclosed is a replication method. The method includes generating an identifier column for a master table, the master table including a key column and an identifier column. Also included is copying the master table to a satellite table, so that the satellite table is a replica of the master table. Further included is associating an insert trigger with the master table. Another inclusion relates to assigning a first identifier value to the identifier column of an inserted row, the assigning caused by the insert trigger and occuring responsively to inserting a row into the master table. Additionally included is allowing inserts to be made to the master table. Included is synchronizing the satellite table to the master table. Synchronizing includes comparing the master table key and identifier columns with the satellite table key and identifier columns. Synchronizing also includes producing a row set of rows based on the initial comparing of synchronizing, the rows being those rows present in the master table but not in the satellite table. Another synchronizing inclusion is comparing the master table key and identifier columns with the satellite table key and identifier columns. Additionally, synchronizing includes deleting the rows that are present in the satellite table but not in the master table, as determined based on the second synchronizing comparing. Synchronizing further includes inserting the row set of rows into the satellite table.

Disclosed is the replication method, further including associating an update trigger with the master table, assigning a second identifier value to the identifier column of the updated row, the assigning caused by the update trigger and occuring responsively to updating a row of the master table, and allowing updates to be made to the master table.

Further disclosed is the possibility of the identifier column including a checksum column or a row version number column. The checksum would be calculated based contents of the row. The row version number would simply be incremented. Likewise disclosed is the possibility of the identifier column including a row version number column. The identifier value is a row version number. The row version number is updated by incrementation.

Also disclosed is a configuration wherein the master table is in a first database, the first database residing on a first computing device and wherein the satellite table is in a second database, the second database residing on a second computing device. The first computing device is communicably coupled to the second computing device. Comparing may be a distributed query.

Moreover, if the identifier value includes a row version number, then determining an activity level of a row based on the row version number associated with that row is possible.

Another disclosure includes designating a pass row version number, such that the pass row version number will not be assigned to any row by incrementing of the row version number during normal operation, assigning the pass row version number to a pass row, and wherein the pass row and the satellite table counterpart to the pass row will not be affected by the synchronizing. A similar disclosure includes designating a postpone row version number, such that the postpone row version number will not be assigned to any row by incrementing of the row version number during normal operation, designating a designated time period, assigning a postpone row version number to a postpone row' and wherein the postpone row and the satellite table counterpart to the postpone row will only be affected by the synchronizing during the designated time period.

Disclosed is a replication method. Generating an identifier column for a master table, the master table including a key column and an identifier column. Copying the master table to a satellite table, so that the satellite table is a replica of the master table. Providing an insert stored procedure, wherein effects of executing the insert stored procedure include inserting a row and assigning a first identifier value. Inserting a row provided as a parameter to the insert stored procedure. Assigning a first identifier value to the identifier column of the inserted row. Allowing inserts to be made to the master table by executions of the insert stored procedure. Synchronizing the satellite table to the master table, the syncrhonizing including several acts. Comparing the master table key and identifier columns with the satellite table key and identifier columns. Producing a row set of rows based on the comparing, the rows being those rows present in the master table but not in the satellite table. Comparing the master table key and identifier columns with the satellite table key and identifier columns. Deleting the rows that are present in the satellite table but not in the master table, as determined based on the comparing. Inserting the row set of rows into the satellite table.

Further disclosed is a replication method. Generating an identifier column for each table of a tree of master tables, each of the master tables including a key column and an identifier column, wherein one of the master tables is a root master table, wherein all of the other master tables are foreign key master tables that are foreign key dependent upon at least one other of the master tables, wherein all of the master tables can be reached by traversal of the tree of master tables. Copying the tree of master tables to a tree of satellite tables, so that the tree of satellite tables is a replica of the tree of master tables. Associating an insert trigger with each of the master tables. Assigning a first identifier value to the identifier column of an inserted row, the assigning caused by one of the insert triggers and occuring responsively to inserting a row into one of the master tables. Allowing inserts to be made to at least one of the master tables. Synchronizing the tree of satellite tables to the tree of master tables, the syncrhonizing including several acts. Comparing the key and identifier columns of each of the master tables with key and identifier columns of each of the satellite tables. Producing row sets of rows, each row set of rows based on one of the comparing, the rows of each row set being those rows present in the master table but not in the satellite table. Comparing the key and identifier columns of each of the master tables with the key and identifier columns of each of the satellite tables. Deleting the rows that are present in the satellite tables but not in the corresponding master tables, as determined based on the comparing, wherein the deleting is ordered from the lowest to highest seniority of satellite tables. Inserting the row sets of rows into the satellite tables, wherein the inserting is ordered from the highest to lowest seniority of satellite tables.

Likewise disclosed is a replication method. Generating an identifier column for each table of a tree of master tables, each of the master tables including a key column and an identifier column, wherein one of the master tables is a root master table, wherein all of the other master tables are foreign key master tables that are foreign key dependent upon at least one other of the master tables, wherein all of the master tables can be reached by traversal of the tree of master tables. Copying the tree of master tables to a tree of satellite tables, so that the tree of satellite tables is a replica of the tree of master tables. Providing an insert stored procedure, wherein effects of executing the insert stored procedure include inserting and assigning: inserting a row provided as a parameter to the insert stored procedure, and assigning a first identifier value to the identifier column of the inserted row. Allowing inserts to be made to at least one of the master tables by executions of the insert stored procedure. Synchronizing the tree of satellite tables to the tree of master tables, the syncrhonizing including several acts. Comparing the key and identifier columns of each of the master tables with key and identifier columns of each of the satellite tables. Producing row sets of rows, each row set of rows based on one of the comparing, the rows of each row set being those rows present in the master table but not in the satellite table. Comparing the key and identifier columns of each of the master tables with the key and identifier columns of each of the satellite tables. Deleting the rows that are present in the satellite tables but not in the corresponding master tables, as determined based on the comparing, wherein the deleting is ordered from the lowest to highest seniority of satellite tables. Inserting the row sets of rows into the satellite tables, wherein the inserting is ordered from the highest to lowest seniority of satellite tables.

Also disclosed is a replication apparatus including a first computing device, a second computing device, a master table stored on the first computing device, a satellite table, an insert trigger, an update trigger, and a row set. The satellite table is stored on the second computing device, the satellite table being a replica of the master table. The insert trigger is associated with the master table, the insert trigger being adapted to calculate a new checksum for each row inserted into the master table and also adapted to assign the new checksum to the inserted row. The update trigger is associated with the master table, the update trigger adapted to recalculate the checksum of each row of the master table as the row is updated and also adapted to assign the recalculated checksum to the updated row. The row set includes rows that are in the master table but not in the satellite table. The rows of the satellite table that are not contained in the master table are deleted from the satellite table. The rows contained in the row set are inserted into the satellite table.

Also disclosed is a replication apparatus including a first computing device, a second computing device, a master table stored on the first computing device, a satellite table, an insert stored procedure, an update stored procedure, and a row set. The satellite table is stored on the second computing device, the satellite table being a replica of the master table. The insert stored procedure is adapted to insert a row into the master table, calculate a new checksum for the inserted row, and assign the new checksum to the inserted row. The update stored procedure is adapted to update a row of the master table, recalculate the checksum of the updated row, and assign the recalculated checksum to the updated row. The row set includes rows that are in the master table but not in the satellite table. The rows of the satellite table that are not contained in the master table are deleted from the satellite table. The rows contained in the row set are inserted into the satellite table.

Additionally disclosed is the alternative of a replication apparatus, as above, but for a tree of master tables stored on the first computing device and a tree of satellite tables stored on the second computing device, the tree of satellite tables being a replica of the tree of master tables. Each of the master tables includes a key column and an identifier column. One of the master tables is a root master table. All of the other master tables are foreign key master tables that are foreign key dependent upon at least one other of the master tables. And all of the master tables can be reached by traversal of the tree of master tables. Each of the satellite tables includes a key column and an identifier column. One of the satellite tables is a root satellite table. All of the other satellite tables are foreign key satellite tables that are foreign key dependent upon at least one other of the satellite tables. And all of the satellite tables can be reached by traversal of the tree of satellite tables.

The present invention achieves many advantages which solve problems left unsolved by the prior art. One of these advantages is that the master table need only be copied in its entirety one time, thereafter only requiring those rows which have changed to be copied. Use of a checksum is advantageous because it is a highly reliable indicator of whether a change has occurred and does not carry any additional information. Use of a row version number is advantageous because it is also highly reliable and has the added advantage that it can carry information about how many times a row has been changed. Application of these to a paradigm including single tables and tables related via foreign key constraints broadens the advantages.

BRIEF DESCRIPTION OF THE DRAWINGS

Other objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

DETAILED DESCRIPTION

In the following detailed description of the preferred embodiments, reference is made to the accompanying drawings which form a part hereof, and in which is shown by way of illustration specific preferred embodiments in which the present invention may be practiced. These embodiments are described in sufficient detail to enable those skilled in the art to practice the present invention, and it is to be understood that other embodiments may be utilized and that logical, mechanical and electrical changes may be made without departing from the spirit or scope of the present invention. To avoid detail not necessary to enable those skilled in the art to practice the present invention, the description may omit certain information known to those skilled in the art. The following detailed description is, therefore, not to be taken in a limiting sense, and the scope of the present invention is defined only by the appended claims.

Figure 1:
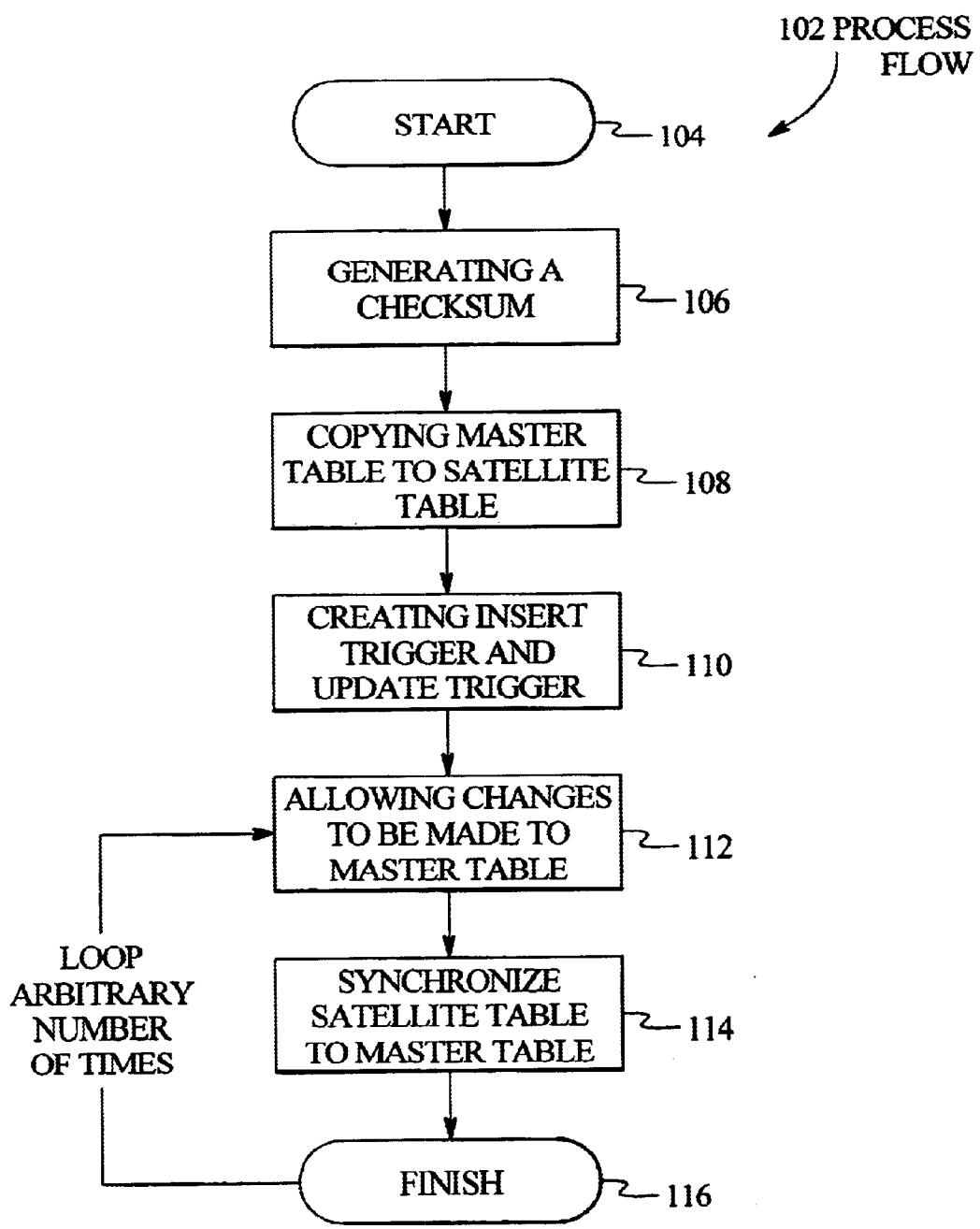
FIG. 1 is a diagrammatic view illustrating an overview of the process flow of an exemplary embodiment of the best mode of the present invention.

Overview 102, FIG. 1, shows the high-level process flow of an embodiment of the present invention. Process flow begins at Block 104. The process then flows to Block 106, in which a checksum column of a master table is filled with initial checksum values so that each row has a checksum value. The checksum value of each row is calculated based on the values of the other fields in that row. The master table also has a key column, the values of the key column rows being unique. The checksum value serves essentially as an identifier value. Another possible identifier value is a row version number.

The process then flows to Block 108, in which the master table is copied to a satellite table, so that the satellite table is a replica of the master table, including the key column and the checksum column. The process then flows to Block 110, in which an insert trigger and update trigger are each created. The insert trigger causes a checksum value to be calculated for an inserted row, responsively to the insertion of the inserted row.

The process then flows to Block 112, in which changes are allowed to be made to the master table. The changes include insertions of new rows and updates of existing rows. The process then flows to Block 114, in which the satellite table and the master table are synchronized. The process then flows to Block 116, in which the process either ends or loops back to Block 112.

Figure 2:
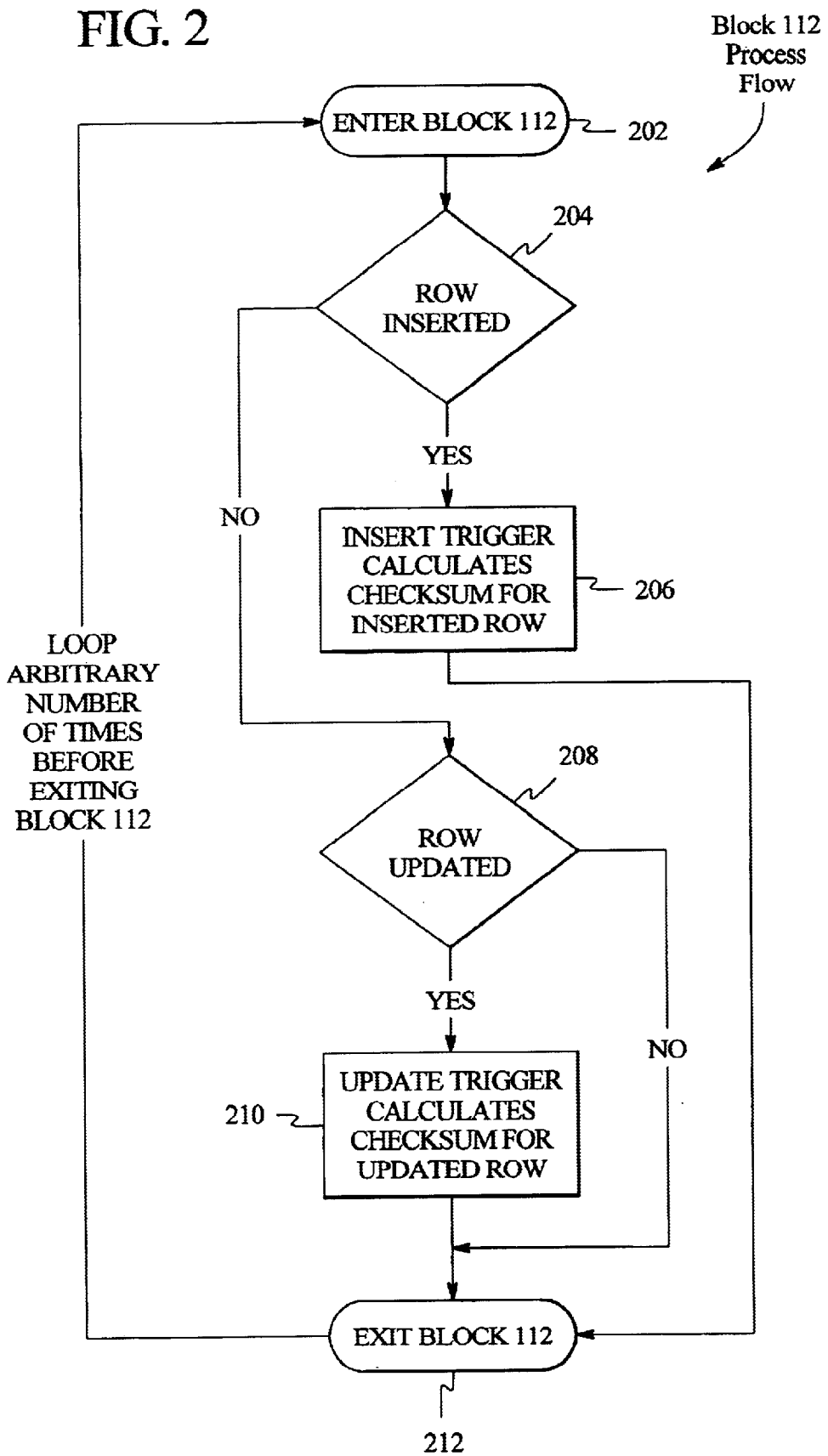
FIG. 2 is a diagrammatic view illustrating the process flow within Block 112, FIG. 1.

Process flow overview 112, FIG. 2, illustrates the process flow contained within Block 112, FIG. 1. The process flow begins in Block 202, which represents the process flow entry into Block 112. The process then flows to Block 204, which is a decision point.

From Block 204, if a row has been inserted, the process flows to Block 206, in which the insert trigger causes a checksum to be calculated for the checksum column of the inserted row. The process then flows to Block 212.

From Block 204, if a row has not been inserted, the process flows to Block 207, which is a decision point. From Block 206, if a row has not been updated, then process flows to Block 212. From Block 206, if a row has been updated, then process flows to Block 210, in which the update trigger causes the checksum value of the updated row to be recalculated based on the updated contents of the updated row. The process then flows to Block 212.

From Block 212, the process may either end or loop back to Block 202. If the process ends, then the process flows out of Block 112, and into Block 114, FIG. 1. This loop-back path allows an arbitrary number of changes to be made to the master table prior to synchronization with the satellite table.

Figure 3:
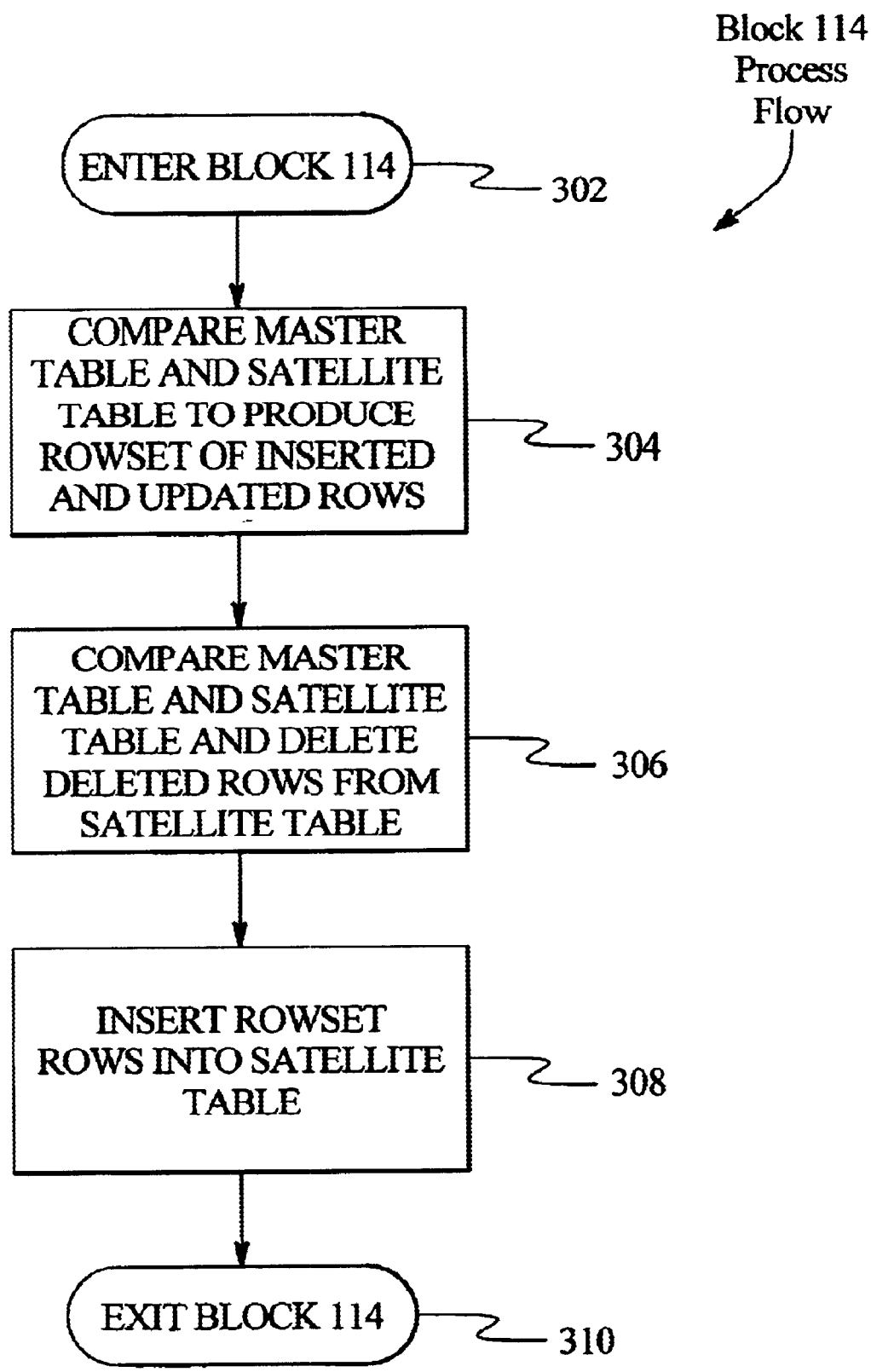
FIG. 3 is a diagrammatic view illustrating the process flow within Block 114, FIG. 1.

Overview 114, FIG. 3, illustrates the process flow contained within Block 114, FIG. 1. The process flow begins in Block 302, which represents the process flow entry into Block 114. The process then flows to Block 304, in which the master and the satellite tables are compared. The comparison is made using only the key and checksum columns of each table via distributed queries. The comparison produces a row set of rows present in the master table but not in the satellite tables. Because changes are not made to the satellite table, the row set rows logically should be inserted rows or updated rows.

The process then flows to Block 306, in which the master and the satellite tables are compared again. This time, the rows that are present in the satellite table but not in the master table are deleted from the satellite table. Logically the deleted rows should be rows that were earlier deleted from the the master table.

The process then flows to Block 308, in which the rows of the row set are inserted into the satellite table. The process then flows to Block 310, which represents the flow of the process out of Block 114.

Figure 4:
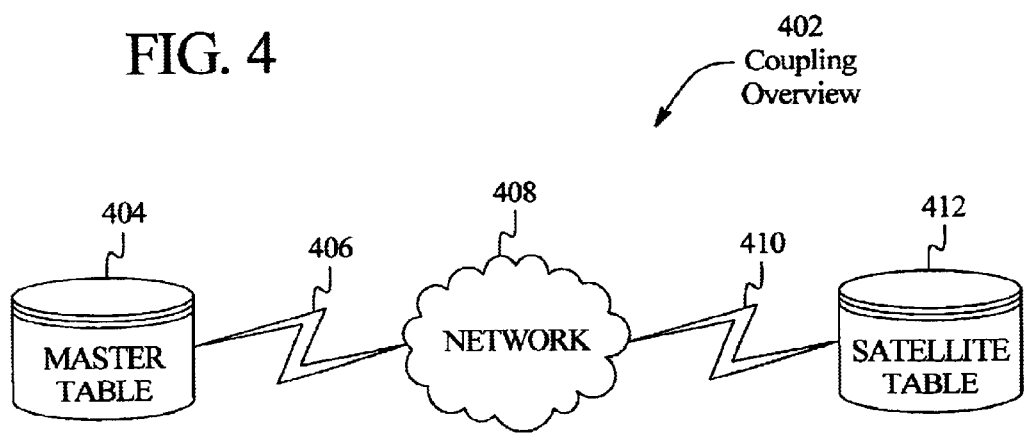
FIG. 4 is a diagrammatic view illustrating an overview of the connectivity possible in an exemplary embodiment of the present invention.

The overview diagramatic view 402, FIG. 4, illustrates a master table 404 that is remotely communicably coupled to a satellite table 412 through a network 408. This contrasts with the possibility of having master table 404 and satellite table 412 on the same machine, for example. Database 404 contains master table 404, and is communicably coupled to network 408, which might be the Internet for example, via communicable coupling 406. Likewise, satellite table 412 is communicably coupled to network 408 via communicable coupling 410.

A tree 502 of master tables illustrates a possible configuration of master tables that are related by foreign key constraints. Master table 504 is the root master table because it does not have a foreign key constraint that depends on any other master table. Master table 506 has a foreign key constraint depending on master table 504. Master table 508 has a foreign key constraint depending on master table 504. Master table 510 has a foreign key constraint depending on master table 506.

By way of illustration, master table 506 has the same seniority as master table 508. And master table 510 has lower seniority than master table 506, master table 508, and master table 504.

Figure 5:
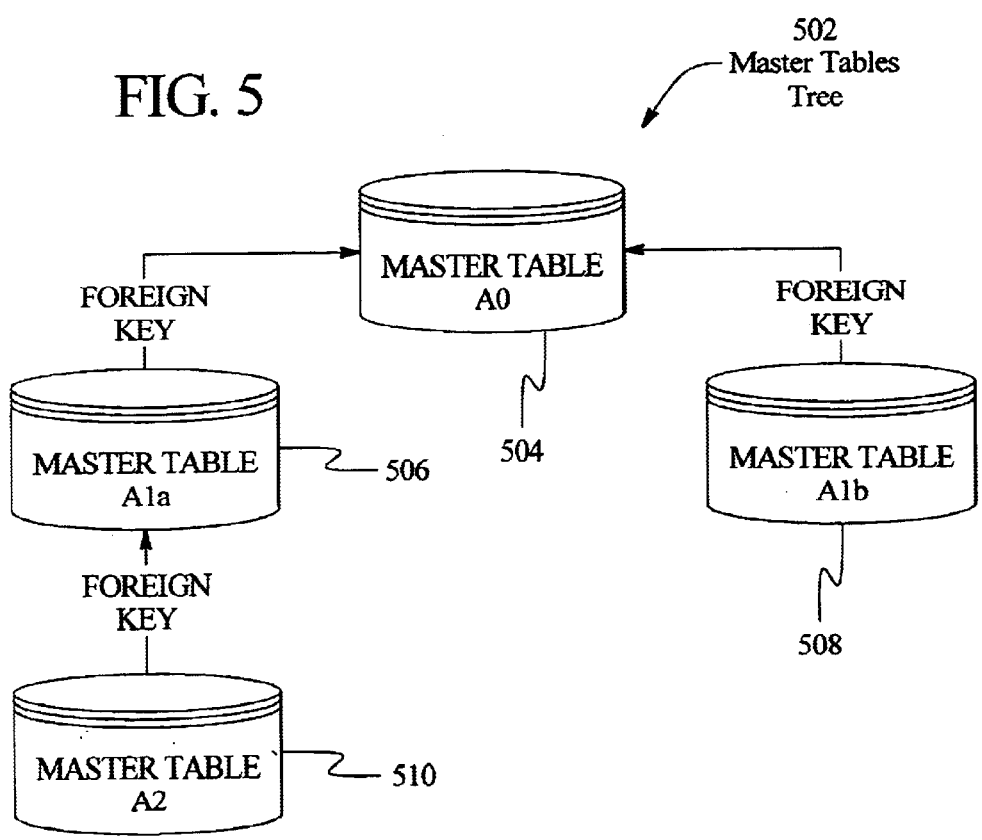
FIG. 5 is a diagrammatic view illustrating an overview of the foreign key relationships possible in the tree of master tables in an exemplary embodiment of the present invention.
Figure 6:
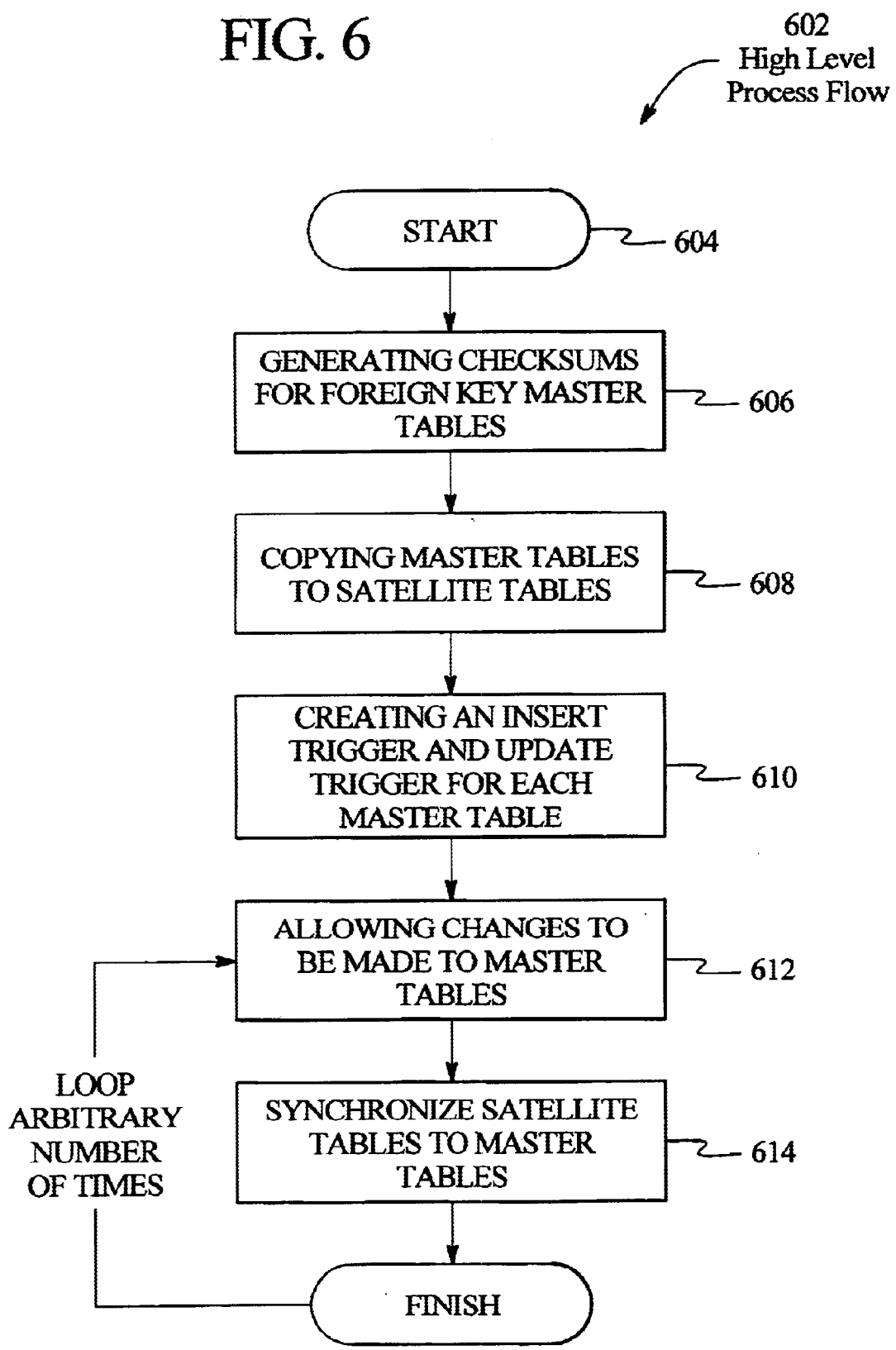
FIG. 6 is a diagrammatic view illustrating an overview of the process flow of an exemplary embodiment of the present invention, incorporating foreign key relationships.

Overview 602, FIG. 6, shows the high-level process flow of an embodiment of the present invention. Process flow begins at Block 604. The process then flows to Block 606, in which checksum columns of master tables composing a tree of master tables are filled with initial checksum values so that each row has a checksum value. The master tables composing a tree of master tables are related via foreign key constraints as illustrated in the example depicted in FIG. 5. The checksum value of each row of each master table is calculated based on the values of the other fields in that row. Each master table also has a key column, the values of the key column rows being unique within each master table. The checksum value serves essentially as an identifier value. Another possible identifier value is a row version number.

The process then flows to Block 608, in which the tree of master tables is copied to a tree of satellite tables, so that the tree of satellite tables is a replica of the tree of master tables, including the key columns and the checksum columns. The process then flows to Block 610, in which an insert trigger for each master table and update trigger for each master table are created. The insert trigger of a given master table causes a checksum value to be calculated for a row inserted into that master table, responsively to the insertion of the inserted row.

The process then flows to Block 612, in which changes are allowed to be made to the master tables. The changes include insertions of new rows and updates of existing rows. The process then flows to Block 614, in which the tree of satellite tables and the tree of master tables are synchronized. The process then flows to Block 616, in which the process either ends or loops back to Block 612.

The process flow withing Block 612, FIG. 6, is similar to the process flow within Block 112, FIG. 1, as depicted in overview 112, FIG. 2. The only difference is that with regard to Block 612, FIG. 6, the process flow depicted in overview 112, FIG. 2 may be directed to any of the master tables.

Figure 7:
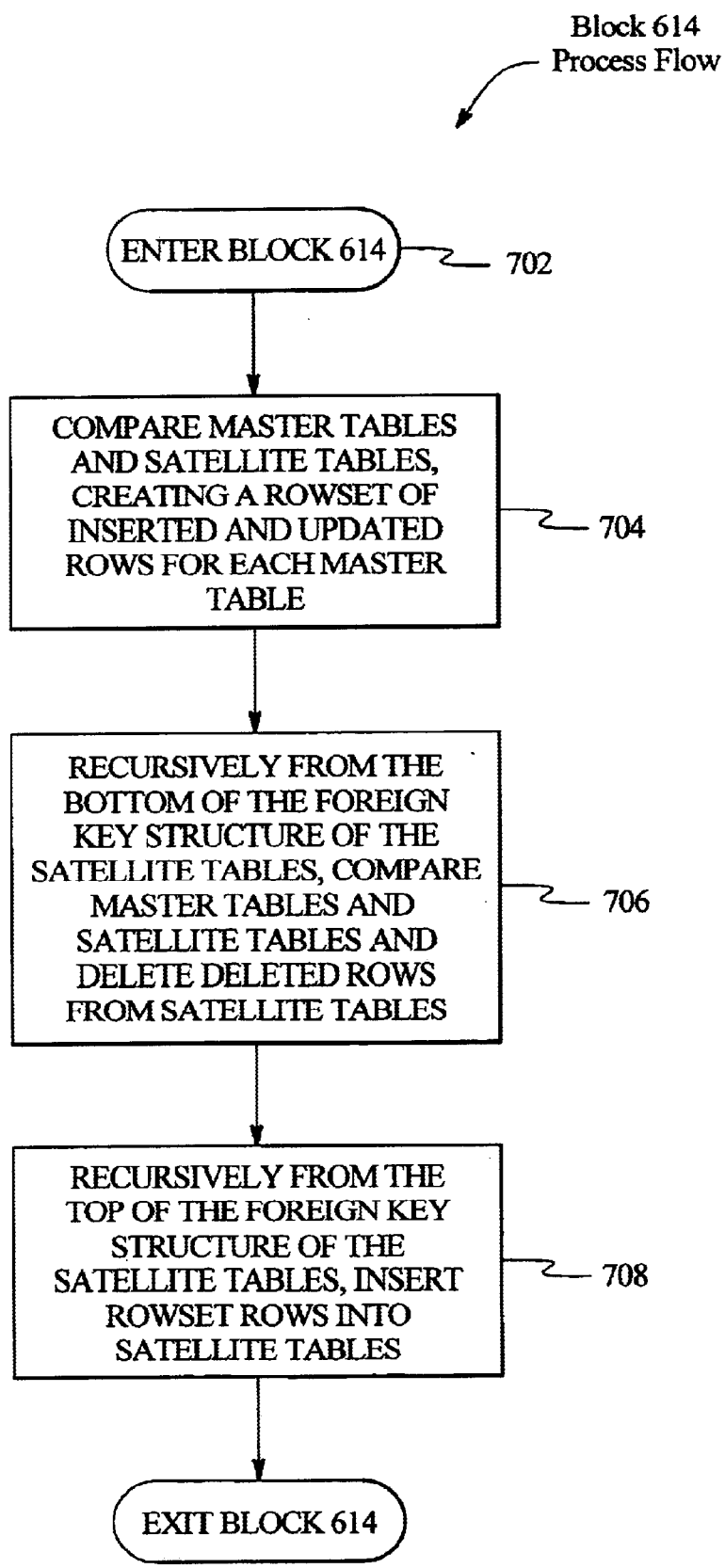
FIG. 7 is a diagrammatic view illustrating the process flow within Block 612, FIG. 6.

Overview 614, FIG. 7, illustrates the process flow contained within Block 614, FIG. 6. The process flow begins in Block 702, which represents the process flow entry into Block 614. The process then flows to Block 704, in which the tree of master tables and the tree of satellite tables are compared. The comparison is made using only the key and checksum columns of each table via distributed queries. The comparison produces a row set of rows for each master table, containing the rows present in that particular master table but not in the corresponding satellite table. Because changes are not made to the satellite tables, the row set rows logically should be inserted rows or updated rows.

The process then flows to Block 706, in which the master and the satellite tables are compared again. This time, the rows that are present in the satellite tables but not in the corresponding master tables are deleted from the satellite tables. Logically the deleted rows should be rows that were earlier deleted from the the master table.

The process then flows to Block 708, in which the rows of the row set are inserted into the satellite table. The process then flows to Block 710, which represents the flow of the process out of Block 614.

Figure 8:
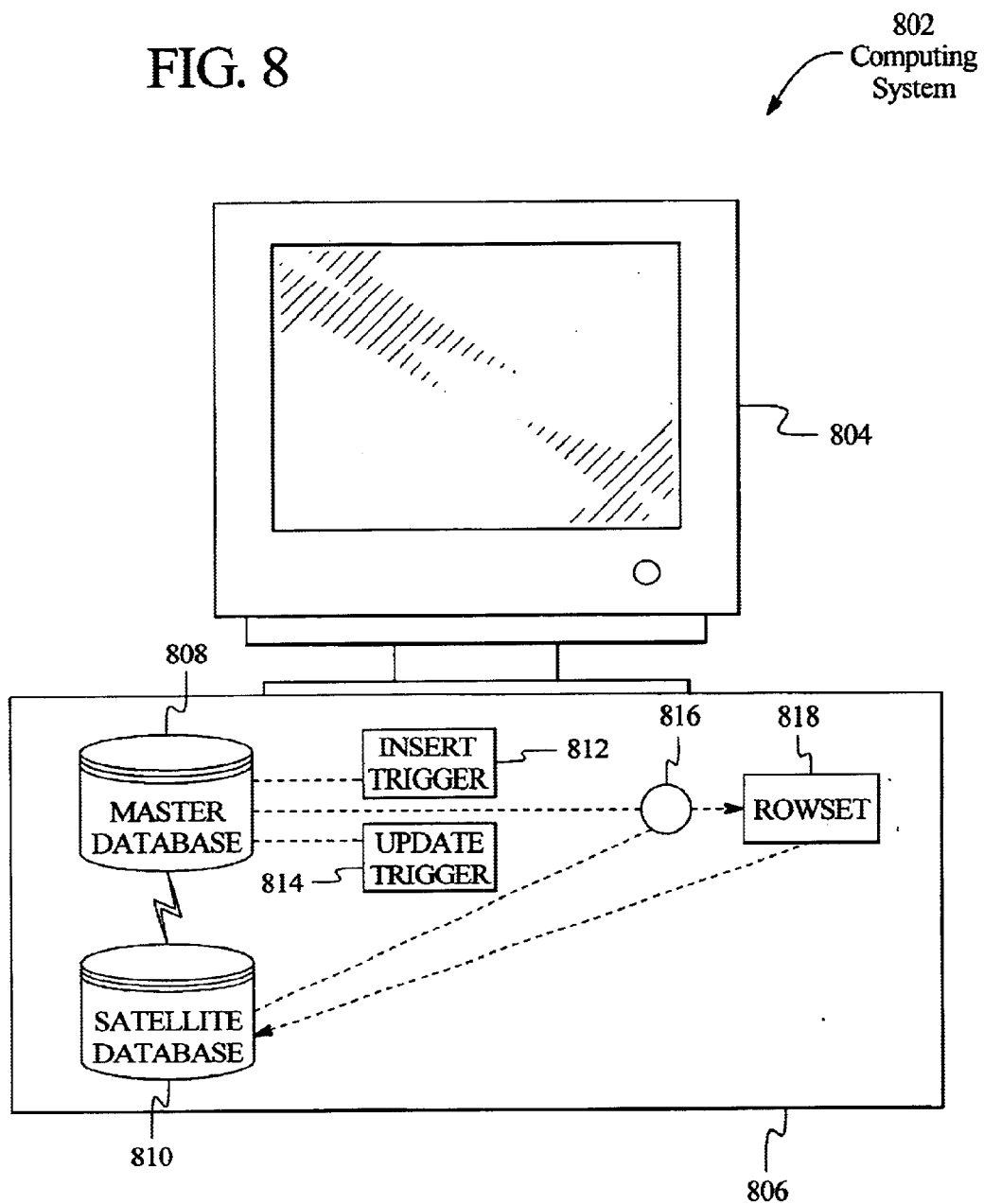
FIG. 8 is a diagrammatic view illustrating the components and relationships of an exemplary embodiment of the present invention.

Computing system 802, FIG. 8, contains an exemplary embodiment of the present invention. Display 804 is communicably coupled to computing device 806. Master database 808 contains a master table. Satellite database 810 contains a satellite table, and is communicably coupled to master database, 808. Insert trigger 812 is associated with the master table such that a row inserted into the master table will have its checksum value responsively calculated. Update trigger 814 is associated with the master table such that a row updated in the master table will have its checksum value responsively recalculated. Comparison 816 compares the master table with the satellite table. Row set 818 contains, after comparison 816 is performed, those rows that are contained in the master table but not contained in the satellite table.

The following guidelines indicate partial meanings of some terms as used herein, although none of these guidelines set forth the exclusive meaning of any term:

The term "network" refers to hardware and software data communication systems. Included in the meaning is a group of interconnected information handling systems such as computers and the communication channels which connect them. The term would include an internet, the Internet, an intranet, an extranet, and any other hardware and software data communication system.

The term "router" refers to a device that forwards packets between networks. The forwarding decision is based on network layer information and routing tables often constructed by routing protocols.

The term "internet" refers to any set of networks interconnected with routers. The term includes a network comprised of other networks. The term would include the Internet, an intranet, an extranet, and any other set of networks interconnected with routers.

The term "Internet" refers to the largest internet in the world. It is a three-level hierarchy composed of backbone networks, midlevel networks, and stub networks. These include commercial, university, and other research networks and military networks and span many different physical networks around the world with various protocols, chiefly the Internet Protocol.

The term "intranet" refers to any network which provides similar services within an organization to those provided by the Internet outside it but which is not necessarily connected to the Internet. May also be an internet or part of the Internet, for example. A common example is the use by a company of one or more web servers on an internal TCP/IP network for distribution of information within the company. The term would include an extranet or any other network which provides Internet-like services within an organization, whether connected to the Internet or not.

The term "extranet" refers to an intranet for which limited access has been granted to other organizations, the general public, or other entities other than the primary user of the intranet.

The term "communicably coupled" refers to any connection that is adapted to carry communication, whatever the supporting technology. It includes hard wire connections such as phone lines, T1 lines, DSL, fiber optic, etc. It also includes wireless connections adapted to carry communication such as via electromagnetic waves, wireless optics (e.g., infrared), etc. The technology by which the communication is transmitted is not material to the meaning of communicably coupled.

The term "non-volatile storage" includes storage devices whose contents are preserved when their power is off. These devices are often used as secondary storage devices. Storage using magnetic media (e.g. magnetic disks, magnetic tape or bubble memory) is normally non-volatile by nature. Other examples of non-volatile storage include Bernoulli Box (trademark of Iomega Corporation), compact disc (CD), computer output on microfilm (COM), computer output on laser disk (COLD), digital audio tape (DAT), digital linear tape (DLT), digital versatile disk (DVD), electrically alterable programmable read-only memory (EAPROM), electrically erasable programmable read-only memory (EEPROM), erasable programmable read-only memory (EPROM), flash erasable programmable read-only memory (FEPROM), floppy disk, floptical, hard disk (removable or fixed), Jaz Drive (trademark of Iomega Corporation), JBOD, disk farm, magnetic disk, magnetic drum, optical disk, magneto-optical disk, one time programmable read-only memory (OTPROM or OTP), programmable read-only memory (PROM), tape drive, paper tape, and punch cards.

The term "volatile storage" includes storage devices whose contents are not ordinarily preserved when their power is off. Examples of volatile memory include semiconductor memories (static RAM and especially dynamic RAM), which are normally volatile but can be made into non-volatile storage by having a (rechargeable) battery or other uninterrupted power supply permanently connected. Dynamic RAM is particularly volatile since it loses its data, even if the power is still on, unless it is refreshed. An acoustic delay line is a (very old) example of a volatile storage device.

The term "memory device" includes any data storage device, including non-volatile, volatile, and other data storage devices.

The term "computing device" includes a device having at least one central processing unit (CPU) and at least one memory device, wherein the CPU is adapted to process data that can be stored in the memory device before and/or after-processing. Common examples of a computing device include personal computer, palm computing device, notebook computer, server, or mainframe. Also included within this definition of computing device is a system of multiple computing devices networked together such that processing and/or storage activities on the computing devices are coordinated. Also included in this definition of computing device is a system of devices networked together such that each device may not be a computing device in its own right, but in combination, the networked devices achieve the functionality of a device having at least one CPU and at least one memory device. For example, components of a computing device may be connected across the Internet or be otherwise communicably coupled.

The term "executing program" includes program code and some private data. The program code may be shared with other executing programs that are executing the same program code but may include different private data. An executing program may include other associated resources such as a process identifier, open files, CPU time limits, shared memory, child processes, and signal handlers. A multitasking operating system can run multiple executing programs concurrently or in parallel.

The term "World Wide Web" (Web, WWW) refers to an Internet client-server hypertext distributed information retrieval system. The Web is actually an Internet facility and is commonly used as a synonym for Internet. The Web has as its foundation the hypertext markup language (HTML) document, which contains links to URLs of other documents on the same web server or on servers anywhere in the world. The Web uses the hypertext transfer protocol (HTTP) to download web pages to a browser such as Netscape Navigator or Internet Explorer. Despite its intense use in conjunction with the Internet, Web technology is not limited to the Internet, being usable in internet, intranet, and local machine settings, for example.

The term "uniform resource locator" (URL) refers to the address that defines the route to a file on the Web or any other internet facility. It may also refer to the address that defines the route to a file stored locally. URLs may be typed into the browser to access web pages or embedded within web pages themselves or other applications to provide HTTP links to web pages or other files. An HTTP link may point to any URL defining a route to a file address regardless of the type of file and regardless of the particular machine on which the file resides. For example, an HTTP link may point to the URL of the web page that contains the HTTP link itself.

The term "web server" refers to an information handling system that provides Web services on an internet. The term may refer to just the software that provides this service or to the computer system and hardware. A web server may host one or more websites which in turn are comprised of one or more web pages.

The term "web page" includes a computer-readable file.

The terms "website" and "web site" are equivalent and include a collection of one or more web pages, including at least one indexed web page known as a home page. All the web pages of the website are intended to be accessed via URLs embedded in the home page or embedded in one of the other web pages of the website.

The term "web browser" includes to a program that serves as an interface to the Web and allows viewing of websites. In the most web browsers, a user may type a URL into the web browser's location field and the home page of that site is downloaded to the user's computer. Web browsers are able to load web pages that are remotely stored files through a network connection, and are also able to load web pages that are locally stored files.

The term "extensible markup language" (XML) refers to an extremely simple generic markup language for representing documents suitable for use on the Web.

The terms "loading a URL" and "loading the web page associated with a URL" include transferring data addressed by the URL from a storage device into a computer's memory. The transfer may occur across a network, but does not need to occur across a network. For example, the term would include transfer of web page data from a web server to a web browser. Also included, for example, would be transfer of web page data from local storage to a locally executing web browser.

The term "loading an Internet keyword" includes loading a web page that is associated with the Internet keyword based on a search algorithm.

The term "database" includes one or more large structured sets of persistent data, usually associated with software to update and query the data.

The term "query" includes a user's (or agent's) request for information, generally as a formal request to a database or search engine. SQL is the most common database query language.

The term "distributed query" includes a query issued against data of multiple databases, wherein at least one of the databases resides on one machine and at least one other of the databases resides on a different machine. A distributed query includes a query that selects data from multiple databases, using, for example, joins, nested queries, or views.

The terms "structured query language" and "SQL" are equivalent and include a language which provides a user interface to relational database management systems, developed by IBM in the 1970s for use in System R. SQL is the de facto standard, as well as being an ISO and ANSI standard. It is often embedded in other programming languages. The first SQL standard, in 1986, provided basic language constructs for defining and manipulating tables of data; a revision in 1989 added language extensions for referential integrity and generalised integrity constraints. Another revision in 1992 provided facilities for schema manipulation and data administration, as well as substantial enhancements for data definition and data manipulation. Development is currently underway to enhance SQL into a computationally complete language for the definition and management of persistent, complex objects. This includes: generalisation and specialisation hierarchies, multiple inheritance, user defined data types, triggers and assertions, support for knowledge based systems, recursive query expressions, and additional data administration tools. It also includes the specification of abstract data types (ADTs), object identifiers, methods, inheritance, polymorphism, encapsulation, and all of the other facilities nonnally associated with object data management.

The term "replication" includes creating and maintaining a duplicate copy of a database or file system on a different computer, typically a server. The term usually implies the intelligent copying of parts of the source database which have changed since the last replication with the destination. Replication may be one-way or two-way. Two-way replication is much more complicated because of the possibility that a replicated object may have been updated differently in the two locations in which case some method is needed to reconcile the different versions. For example, Lotus Notes® can automatically distribute document databases across telecommunications networks. Notes support a wide range of network protocols including X.25 and Internet TCP/IP. The term "trigger" includes a stored program unit associated with a specific database table. For example, the program unit may be a PL/SQL program unit. For example, ORACLE® executes (fires) the database trigger automatically whenever a given SQL operation affects the table. So, unlike subprograms, which must be invoked explicitly, database triggers are invoked implicitly. Among other things, you can use database triggers to audit data modification, log events transparently, enforce complex business rules, derive column values automatically, implement complex security authorizations, maintain replicate tables. A trigger is also an action causing the automatic invocation of a procedure, for instance to preserve referential integrity. For example, a trigger could go into effect when a user attempts to modify data with an insert, delete, or update command. For example, a trigger can instruct the system to take any number of actions when a specified change is attempted. Triggers may be used to maintain the integrity of the associated database by preventing incorrect, unauthorized, or inconsistent changes to data.

The term "tree" includes a collection of nodes and edges. This definition includes a graph such that there is a path between any pair of nodes (via zero or more other nodes). Thus if we start from any node and visit all nodes connected to it by a single edge, then all nodes connected to any of them, and so on, then we will eventually have visited every node in the connected graph. In this definition, there is a notion of "toward top of the tree" (i.e. the root node), and its opposite direction, "toward the leaves."

The term "seniority," as applied to nodes of a tree, includes the proximity of a node of a tree to the root node of that tree. For example, the tree node with the highest seniority is the root node, while the the node or nodes with the greatest shortest path(s) to the root node have the lowest seniority. Path length is defined as the number of nodes that must be traversed in moving between two nodes. A shortest path is defined as the path between two nodes such that no other path between the same nodes has a shorter length.

Any element in a claim that does not explicitly state "means for" performing a specified function, or "step for" performing a specific function, is not to be interpreted as a "means" or "step" clause as specified in 35 U.S.C. §112, å6. In particular, the use of "step of" in the claims herein is not intended to invoke the provision of 35 U.S.C. §112, ¶6.

Although the present invention has been described with a certain degree of particularity, it should be recognized that elements thereof may be altered by persons skilled in the art without departing from the spirit and scope of the present invention. The present invention is limited only by the following claims and their equivalents.

What is claimed is:

1. A method for synchronizing a satellite table to a master table, the method comprising the steps of:

comparing a key column and identifier column of the master table with a key column and identifier column of the satellite table;

producing a row set of rows based on said comparing step, said rows being rows present in the master table but not present in the satellite table;

deleting rows present in the satellite table but not present in the master table, as determined based on said comparing step; and inserting the row set of rows into the satellite table.

2. A method for synchronizing a satellite table to a master table as claimed in claim 1, wherein the master table is in a first database residing on a first computing device, the satellite table is in a second database residing on a second computing device, and the first computing device is in communication with the second computing device.

3. A method for synchronizing a satellite table to a master table as claimed in claim 1, wherein said comparing step further comprises issuing a distributed query command.

* * * * *